UNITED STATES PATENT OFFICE 2,545,920

TRANSURANIC METAL HALIDES AND A PROCESS FOR THE PRODUCTION THEREOF

Sherman Fried, Chicago, Ill., assignor to the United States of America as represented by the United States Atomic Energy Commission No Drawing. Application July 15, 1947,
Serial No. 761,143

10 Claims. (Cl. 23—14.5)

This invention relates to transuranic metal halides and a process for their preparation.

It has recently become known that various new chemical elements having atomic numbers greater than uranium can be prepared. These new chemical elements are called transuranic elements and include neptunium, plutonium, americium, and curium, having atomic numbers of 93, 94, 95 and 96, respectively. Isotopes of these elements are suitably prepared by neutron bombardment of uranium. For example, at least one isotope of each of neptunium and americium and three of plutonium are formed in a chain-reacting pile when natural uranium, consisting primarily of $U^{238}$, is irradiated with neutrons according to the following reactions.

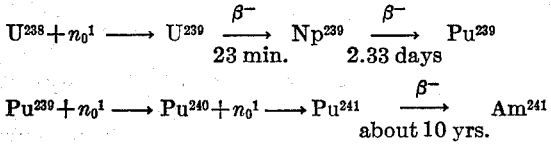

$$Pu^{239} + n_0^1 \longrightarrow Pu^{240} + n_0^1 \longrightarrow Pu^{241} \xrightarrow[\text{about 10 yrs.}]{\beta^-} Am^{241}$$

In addition $Np^{237}$ is produced in the pile, when it is operated for a long time. Also produced in the chain-reacting pile are elements of lower atomic number by fission of $U^{235}$, which is present in an amount of about 0.71% by weight in natural uranium. By various chemical processes it has been possible to separate these various transuranic elements as compounds, such as their hydroxides. In order to utilize isotopes of these transuranic elements, such as $Np^{237}$ and $Pu^{239}$ in power-producing, chain-reacting piles these transuranic elements are suitably used in their elemental form, i. e., as metals. To prepare the metal from the hydroxide, it is desirable to prepare the halide and reduce the halide to the metal. Aqueous solutions of the water-soluble transuranic metal halides are suitable for power-producing, homogeneous, chain-reacting piles.

An object of this invention is to provide new compounds of transuranic elements.

Another object of this invention is to provide a process for the production of transuranic metal halides.

Other objects will be apparent from the description which follows.

I have found that halides of transuranic elements can be prepared by contacting with aluminum and a halogen or with a compound of aluminum and a halogen, namely, an aluminum trihalide, a transuranic metal compound of the group consisting of oxides, oxyhalides, and halides and mixtures thereof at an elevated temperature. Where oxyhalides and halides of transuranic elements are used the halogen of such compounds is more electronegative than the halogen used with aluminum or in the aluminum trihalide.

When aluminum and a halogen are used the amounts are suitably at least the stoichiometric amounts required to convert the starting transuranic metal compound to the desired transuranic metal halide. The same is true when an aluminum trihalide is used as the reactant. Usually the trihalide of the transuranic element is produced and this is especially true when a mixture of aluminum and halogen is used where the amount of aluminum is in excess of the amount that will react with the halogen.

In carrying out the process of the present invention in all of its embodiments it is preferred that the elevated temperature be at least 100° C. and more preferably be between about 150 and 1000° C. The time of reaction for conversion to the desired transuranic metal halide is inversely proportional to the temperature. A suitable time of reaction is between about 1 and 20 hours. Solid reactants are preferably ground to a fine state of subdivision and intimately mixed in order to increase the rate of reaction.

In accordance with the present invention the transuranic metal compound is reacted in a reaction chamber with an aluminum trihalide admixed with the transuranic metal compound, or aluminum is admixed with the transuranic metal compound outside or within the reaction chamber and the aluminum trihalide is prepared in situ by introducing halogen at normal temperature or at an elevated temperature. When the halogen is introduced at a normal temperature some reaction with aluminum occurs and this is accelerated by elevating the temperature and the resultant aluminum trihalide at the elevated temperature reacts with the transuranic metal compound. The reaction is preferably carried out in a closed chamber.

In one embodiment of the invention an oxide of a transuranic element is mixed with finely divided aluminum and placed in the reaction chamber and a halogen is introduced into the reaction chamber, which is then heated to an elevated temperature, or which is at the elevated temperature before introduction of the halogen. The aluminum is reacted upon by the halogen to form an aluminum trihalide and this compound reacts with the transuranic metal oxide as illustrated by the following probable equation:

$$6MO_2 + 8AlX_3 \rightarrow 6MX_3 + 4Al_2O_3 + 3X_2$$

wherein M and X are transuranic element and halogen, respectively. Suitable oxides for this reaction include neptunium dioxide, plutonium dioxide, and americium dioxide. Preferred halides of aluminum are aluminum trichloride, aluminum tribromide, and aluminum triiodide, which are prepared by reaction in situ as described above. The transuranic metal halide is removed from the reaction product by sublimation in vacuo.

The following examples illustrate this embodiment of the invention.

*Example I*

Forty-five micrograms of neptunium dioxide and 50 micrograms of aluminum were placed in a quartz capillary. It was then attached to a vacuum line and the vapor space was evacuated. Bromine was introduced at a slightly elevated temperature until a slug of aluminum tribromide had formed and practically closed the capillary. The capillary was then sealed off so that its length was about 4 inches. It was placed in a heavy-walled glass tube and the tube was sealed and placed in a steel jacket. The entire system was heated in a furnace for 12 hours at 350 to 400° C. Upon cooling the capillary was removed and found to contain a greenish melt. Separation of the various components was accomplished by fractional sublimation in vacuo with the excess aluminum tribromide being removed at about 250° C. The portion of the capillary containing the condensed aluminum tribromide was separated from the remainder of the tube by sealing off the tube at an intermediate point. Upon heating the remaining portion of the tube to 600° C. aluminum sublimed out. Upon further heating to 800° C. a green substance volatilized and it was identified through its X-ray diffraction pattern as neptunium tribromide. It was hexagonal with two molecules per unit cell and was isomorphous with uranium tribromide. Its lattice dimensions were:

$$a_1 = 7.917 \pm 0.005 \text{ Å.}$$
$$a_3 = 4.382 \pm 0.005 \text{ Å.}$$

The calculated density was $\rho = 7.11$.

*Example II*

Neptunium dioxide and aluminum metal were placed in the bottom of a quartz capillary and a few small fragments of iodine were added. After evacuation of the vapor space the capillary was sealed and placed in a heavy-walled glass tube. The tube was then sealed and placed in a steel jacket. The entire system was heated in a furnace for 12 hours at 300 to 350° C. Upon cooling the capillary was removed and connected to a vacuum line. The bottom portion of the capillary was heated and aluminum triiodide was distilled out at a temperature of about 250° C. Upon heating the residue to 800° C. a brownish-white material sublimed out and it was identified by its X-ray diffraction pattern as neptunium triiodide. It was orthorhombic with 4 molecules per unit cell and isomorphous with uranium triiodide. Its lattice dimensions were:

$$a_1 = 13.93 \pm 0.04 \text{ Å.}$$
$$a_2 = 4.31 \pm 0.03 \text{ Å.}$$
$$a_3 = 9.94 \pm 0.05 \text{ Å.}$$

The calculated density was $\rho = 6.82$.

*Example III*

A 50-microgram sample of americium hydroxide was dried in an oven for 3 hours at 150° C. The dried product was placed in a quartz capillary with a few fragments of aluminum metal and the capillary was connected to a vacuum line. After evacuation of the vapor space and heating the bottom portion of the capillary to about 200° C. pure bromine vapor was admitted. As aluminum tribromide was formed by the action of bromine on aluminum it distilled to the cool portion of the tube where it condensed and formed a solid slug. The capillary was sealed off in vacuo, placed in a heavy-walled glass tube, and the latter was sealed with one atmosphere of air inside. The tube was placed in a steel jacket, loosely capped at both ends and the entire system was heated for 8 hours at 500° C. The capillary was removed and connected in a tilted position to a vacuum line. The bottom portion was surrounded by an electrically heated nickel block. After excess aluminum tribromide and bromine had distilled out at about 200° C., a white solid sublimed at about 850 to 900° C. and was collected in the cool portion of the capillary. The white solid was identified by its X-ray diffraction pattern as americium tribromide. It was orthorhombic and isomorphous with plutonium tribromide. Its lattice dimensions were:

$$a_1 = 12.5 \pm 0.1 \text{ Å}$$
$$a_2 = 4.10 \pm 0.04 \text{ Å.}$$
$$a_3 = 9.10 \pm 0.05 \text{ Å.}$$

The calculated density was $\rho = 6.8$.

*Example IV*

Plutonium hydroxide containing 100 micrograms of plutonium was dried for several hours at 150° C. The dried pellet was placed in a quartz capillary tube and several pellets of aluminum were added. Several small slivers of iodine were introduced. The vapor space was evacuated and the capillary sealed off to a length of about 6 inches. It was placed in a heavy-walled quartz tube. The latter was sealed off and placed in a steel jacket. The entire system was heated in a furnace for 12 hours at 800 to 900° C. The capillary was removed and the products were separated by fractional sublimation in vacuo using the method of Example III. Excess aluminum triiodide and iodine were sublimed out by heating the bottom portion of the capillary in the furnace up to 500° C. When the temperature was raised, a green material sublimed at a temperature of 800 to 850° C. It was identified by its X-ray diffraction pattern as plutonium triiodide.

*Example V*

Dried americium hydroxide and aluminum metal were placed in the bottom of a quartz capillary and a few fragments of iodine were added. After evacuation of the vapor space, the capillary was sealed off. The sealed capillary was placed in a heavy-walled glass tube. The tube was sealed off with one atmosphere of air inside and placed in a steel jacket, loosely capped at both ends. The entire system was heated for 12 hours at 500° C. Upon cooling the capillary was removed and its contents were separated by fractional sublimation in vacuo, in accordance with the method described in Example III. At 900° C. a yellow material sublimed. It was identified by its X-ray diffraction pattern as americium triiodide. It was orthorhombic and isomorphous with neptunium triiodide and plutonium triiodide. Its lattice constants were:

$$a_1 = 13.9 \pm 0.1 \text{ Å.}$$
$$a_2 = 4.30 \pm 0.03 \text{ Å.}$$
$$a_3 = 9.9 \pm 0.1 \text{ Å.}$$

There were four molecules per unit cell, corresponding to a calculated density of $\rho=6.9$. The structure is of the layer lattice type. Each americium atom is bonded to eight iodine atoms, the mean interatomic distance being Am—I=3.33 Å.

In another embodiment of this invention an oxide of a transuranic element is contacted with an aluminum trihalide at an elevated temperature and the transuranic metal halide is recovered by sublimation in vacuo. The preferred transuranic metal oxides and aluminum trihalides are those listed in the first embodiment of this invention.

The following examples illustrate this embodiment of the invention.

Example VI

Fifty micrograms of neptunium dioxide was heated in a quartz capillary with about 100 micrograms of aluminum tribromide at 350° C. for 12 hours using a heavy-walled glass jacket, a steel jacket, and a furnace as used in Example I. Upon cooling the capillary was removed and the products separated by fractional sublimation in vacuo. Aluminum tribromide came off at 250° C. A reddish-brown material sublimed at 500 to 550° C. and was found by X-ray analysis to be neptunium tetrabromide, isomorphous with uranium tetrabromide. At 800° C. a green material sublimed and by X-ray analysis it was identified as neptunium tribromide.

Example VII

A sample of plutonium hydroxide was dried at 130° C. and the dried material was placed in a glass capillary along with aluminum trichloride. The vapor space in the capillary was evacuated and the capillary was sealed off and placed in a heavy-walled glass tube, which was then sealed off to form a microbomb tube containing 1 atmosphere of air. After heating at 200° C. for 8 hours the capillary was removed from its glass jacket and connected to a vacuum line. The bottom of the capillary containing the melt from the reaction was surrounded by an electrically heated nickel block. A sublimate was collected in the upper, cool portion of the capillary and was identified by X-ray analysis as plutonium trichloride.

In a third embodiment of this invention a transuranic metal halide is produced from another transuranic metal halide, i. e., by replacement of one halogen with another halogen. As in the first two embodiments, aluminum trihalide used to react with the starting transuranic metal halide is added as such or is prepared in situ and the reaction is carried out at an elevated temperature. In this embodiment, the halogen of the starting transuranic metal halide is more electronegative than the halogen used with aluminum or in the aluminum trihalide. The following equation illustrates the probable reaction where the starting transuranic metal halide is the tetrafluoride.

$$3MF_4 + 4AlX_3 \rightarrow 3MX_3 + 4AlF_3 + 3/2X_2$$

wherein M is a transuranic element and X is either chlorine, bromine, or iodine. Where the starting transuranic metal halide is other than transuranic metal tetrafluoride, the reaction is illustrated for the conversion of a transuranic metal trihalide by the following probable equation.

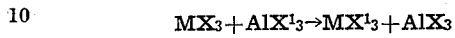

$$MX_3 + AlX^1_3 \rightarrow MX^1_3 + AlX_3$$

wherein M is a transuranic element, X is a chlorine or bromine, and $X^1$ is either bromine or iodine when X is chlorine and $X^1$ is iodine when X is bromine. The resultant transuranic metal halide is separated from the resultant aluminum trihalide by fractional sublimation in vacuo.

The following example illustrates this embodiment of the present invention.

Example VIII

About 100 micrograms of plutonium tetrafluoride was placed in a capillary, and about 200 micrograms of anhydrous aluminum trichloride was added. The vapor space was evacuated, and the capillary was sealed off and placed in a heavy-walled glass tube. The tube was sealed off with one atmosphere of air inside and then heated at 200° C. for 12 hours. After cooling, the capillary was removed from its glass jacket. A few yellow crystals were along the walls of the capillary and a green fused material was at the bottom of the capillary tube. The latter was identified by X-ray analysis as plutonium trichloride.

In another embodiment of the present invention a transuranic metal halide is produced by contacting with a mixture of aluminum and a halogen or with an aluminum trihalide a transuranic metal oxyhalide at an elevated temperature. As in the third embodiment, the halogen of the starting transuranic metal compound is more electronegative than the halogen used with aluminum or in the aluminum trihalide. Thus, a transuranic metal oxyfluoride is converted to a transuranic metal chloride, bromide, or iodide by contacting the oxyfluoride with aluminum and with chlorine, bromine, and iodine, respectively, or by contacting the oxyfluoride with aluminum trichloride, aluminum tribromide, and aluminum triiodide, respectively. Similarly, a transuranic metal oxychloride is converted to a bromide or iodide and an oxybromide is converted to an iodide. For example, neptunyl fluoride, i. e., neptunium dioxydifluoride, is heated to 500° C. and maintained at that temperature for several hours in the enclosed system in contact with aluminum trichloride. The resultant neptunium tetrachloride is recovered by fractional sublimation in vacuo.

In all of the foregoing examples the process was carried out in a closed reactor and thus substantially under the vapor pressure of the reactants and the products. In the case of the process where aluminum trihalide is formed in situ the reaction may be caried out under an increased vapor pressure due to excess halogen.

Although the examples have described experiments that were carried out on a small scale, it is to be understood that the process of the present invention is suitably carried out on a large scale and that the necessary equipment would be apparent to those skilled in the art.

While preferred embodiments of the present invention are described above, other modifications may be made without departing from the scope and spirit of the invention. Thus, this

What is claimed is:

1. A process for the production of a transuranic metal halide which comprises contacting with aluminum and a halogen a transuranic metal compound of the group consisting of oxides, oxyhalides, and halides and mixtures thereof, said oxyhalides and halides containing a halogen more electronegative than the halogen reactant, at an elevated temperature and recovering the resultant transuranic metal halide from the reaction product.

2. A process for the production of a transuranic metal halide which comprises contacting a transuranic metal oxide with aluminum and a halogen at a temperature between 150 and 1000° C. and recovering the resultant transuranic metal halide from the reaction product.

3. A process for the production of a neptunium halide which comprises contacting neptunium dioxide with aluminum and a halogen at a temperature between 150 and 1000° C. and recovering the resultant neptunium halide from the reaction product.

4. The process of claim 3 wherein the halogen is iodine.

5. A process for the production of an americium halide which comprises contacting americium dioxide with aluminum and a halogen at a temperature between 150 and 1000° C. and recovering the resultant americium halide from the reaction product.

6. The process of claim 5 wherein the halogen is iodine.

7. A process for the production of a transuranic metal halide which comprises contacting a transuranic metal oxide with an aluminum trihalide at a temperature between 150 and 1000° C. and recovering the resultant transuranic metal halide from the reaction product.

8. A process for the production of a neptunium halide which comprises contacting neptunium dioxide with an aluminum trihalide at a temperature between 150 and 1000° C. and recovering the resultant neptunium halide from the reaction product.

9. The process of claim 8 wherein the aluminum trihalide is aluminum tribromide.

10. A process for the production of a transuranic metal halide which comprises contacting with aluminum and a halogen a transuranic metal halide, containing a halogen more electronegative than the halogen reactant, at a temperature between 150 and 1000° C. and recovering the resultant transuranic metal halide.

SHERMAN FRIED.

REFERENCES CITED

The following references are of record in the file of this patent:

Friend, Textbook of Inorganic Chemistry, volume 7, part 3, page 293 (1926). Published by Charles Griffin and Company, Ltd., London.

Seaborg, Chemical and Engineering News, volume 23, No. 23, pages 2190–3, December 10, 1945.